(12) United States Patent
Koti et al.

(10) Patent No.: US 12,280,679 B2
(45) Date of Patent: Apr. 22, 2025

(54) FUEL CELL POWERTRAIN SYSTEMS AND METHODS FOR POWER SPLIT AND ALLOCATION IN FUEL CELL POWERTRAIN SYSTEMS

(71) Applicants: Cummins Inc., Columbus, IN (US); Hydrogenics Corporation, Mississauga (CA)

(72) Inventors: Archit N. Koti, Sunnyvale, CA (US); Patrick Kaufman, Vacaville, CA (US); Elizabeth Weitzel, Columbus, IN (US); Vivek Anand Sujan, Columbus, IN (US); Martin T. Books, Columbus, IN (US); Chinmay Rao, Columbus, IN (US); Yongfei Yu, Dublin, OH (US); Sharon Liu, Columbus, IN (US); Sumit Tripathi, Columbus, IN (US); David P. Genter, Columbus, IN (US); Agneya Turlapati, Indianapolis, IN (US); Rohit Saha, Columbus, IN (US); Jifei Yan, Columbus, IN (US)

(73) Assignees: Cummins Inc., Columbus, IN (US); Hydrogenics Corporation, Mississauga (CA)

( * ) Notice: Subject to any disclaimer, the term of this patent is extended or adjusted under 35 U.S.C. 154(b) by 206 days.

(21) Appl. No.: 17/549,490

(22) Filed: Dec. 13, 2021

(65) Prior Publication Data
US 2023/0182585 A1    Jun. 15, 2023

(51) Int. Cl.
*B60L 50/75* (2019.01)
*B60L 58/16* (2019.01)
(Continued)

(52) U.S. Cl.
CPC .............. *B60L 50/75* (2019.02); *B60L 58/16* (2019.02); *B60L 58/30* (2019.02);
(Continued)

(58) Field of Classification Search
None
See application file for complete search history.

(56) References Cited

U.S. PATENT DOCUMENTS 7,087,329 B2   8/2006   Converse
7,807,306 B2   10/2010  Kilian
(Continued)

FOREIGN PATENT DOCUMENTS

CN        1263629 C      7/2006
CN        108656981 A    10/2018

*Primary Examiner* — Jared Fureman
*Assistant Examiner* — Joel Barnett
(74) *Attorney, Agent, or Firm* — Barnes & Thornburg LLP

(57) ABSTRACT

The present disclosure generally relates to systems and methods for implementing power a power split between a first and a second power source in a fuel cell powertrain system. The method includes receiving an input into a processor of the fuel cell powertrain system, determining an output by the processor, communicating the output by the processor to a system controller and determining a power split by the system controller. The first power source includes a fuel cell system and the second power source is selected from a battery system or an engine, and the input includes a life or health of at least one of the first power source or the second power source.

22 Claims, 8 Drawing Sheets

(51) Int. Cl.
    *B60L 58/30*         (2019.01)
    *H01M 8/04858*    (2016.01)
    *H01M 10/42*       (2006.01)
    *H01M 16/00*       (2006.01)

(52) U.S. Cl.
    CPC ....... *H01M 8/0494* (2013.01); *H01M 10/425* (2013.01); *H01M 16/006* (2013.01); *H01M 2010/4271* (2013.01)

(56) References Cited

U.S. PATENT DOCUMENTS

| | | | |
|---|---|---|---|
| 8,361,666 B2 | 1/2013 | Hibino | |
| 2005/0112428 A1 | 5/2005 | Freeman | |
| 2010/0332060 A1 | 12/2010 | Bae | |
| 2012/0259490 A1* | 10/2012 | Yang | B60W 10/115 |
| | | | 701/22 |
| 2014/0162159 A1* | 6/2014 | Lebzelter | H01M 8/04679 |
| | | | 429/432 |
| 2016/0052410 A1* | 2/2016 | Zhou | B60L 58/20 |
| | | | 320/109 |
| 2016/0052505 A1* | 2/2016 | Zhou | B60L 15/2045 |
| | | | 903/930 |
| 2016/0172695 A1* | 6/2016 | Kwon | H01M 8/0494 |
| | | | 429/442 |
| 2019/0227126 A1* | 7/2019 | Books | G01R 31/3647 |
| 2020/0198495 A1* | 6/2020 | Rizzoni | B60W 10/06 |
| 2020/0398813 A1* | 12/2020 | Hung | B60L 58/12 |

\* cited by examiner

FUEL CELL POWERTRAIN SYSTEMS AND METHODS FOR POWER SPLIT AND ALLOCATION IN FUEL CELL POWERTRAIN SYSTEMS

TECHNICAL FIELD

The present disclosure generally relates to systems and methods for determining, optimizing, implementing, and/or improving a power split and/or allocation between different power sources in a fuel cell powertrain system.

BACKGROUND

A typical fuel cell powertrain system comprises more than one power source. For example, the power sources of a fuel cell powertrain system may comprise one or more fuel cell systems and/or one or more high voltage battery systems or packs. Since fuel cell powertrain systems typically have more than one power source, real time determination of a split of power and/or an allocation of power between the different power systems has an important and consequential impact.

Allocation of power and use of different fuel cell systems and battery systems or packs in a fuel cell powertrain system may influence life of each power source, thermal needs of each power source, performance of the fuel cell powertrain system, and/or efficiency of the fuel cell powertrain system, among other attributes. The minimum requirement for any power split between the power sources is the need for the selected power sources to be able to meet the load needs of the fuel cell powertrain system. A simple strategy or algorithm may achieve this functionality without regard for specific attributes of the fuel cell systems and/or the battery systems or packs.

However, implementation of a simple strategy or algorithm may lead to a suboptimal method of control of the power sources in terms of efficiency, life, performance, and other attributes of the respective fuel cell systems and/or battery systems or packs. Accordingly, control strategies or algorithms may be devised to determine the power split between the various power sources based on the load demand, the mode of operation of the power sources, the capability of the power sources, the lifespan and/or health of the power sources.

Described herein are systems and methods related to various aspects of a fuel cell system and/or a battery pack control as well as power split or power allocation strategies and algorithms Described herein are systems and methods to meet specific objectives such as life, efficiency, and/or performance of the power sources in a fuel cell powertrain system. Described herein are methods, processes, strategies, algorithms, and/or embodiments that may result in better control and use of a fuel cell powertrain system.

SUMMARY

Embodiments of the present invention are included to meet these and other needs. In one aspect, described herein is a method of implementing power from first and second power sources in a fuel cell powertrain system. The method may include receiving an input into a processor of the fuel cell powertrain system, determining an output by the processor, communicating the output by the processor to a system controller, and determining a power split by the system controller. The power split may include implementing a power split between a first power associated with the first power source, and a second power associated with the second power source. The first power source includes a fuel cell system and the second power source is selected from a battery system or an engine, and the input includes a life or health of at least one of the first power source or the second power source.

The input may include a power limit associated with the fuel cell system. The power limit may be determined based on a mode of operation or a capability of the fuel cell system. The input may be an accessory demand input, traction capability input, or driver demand input of the fuel cell powertrain system. The input may be a power capability or state-of-charge of the battery system.

The life or health may be associated with a transient limit, the minimum or maximum number of starts or stops, the state-of health, or the throughput of the associated power source(s).

The fuel cell powertrain system may be part of and configured to move a vehicle. The fuel cell powertrain system may comprise a traction system configured to receive the first power and the second power. The input may include information about the operating efficiency of the fuel cell stack.

In another aspect, described herein is a system for implementing a power split between power sources in a fuel cell powertrain system. The system may include a first power system comprising a fuel cell stack configured to produce a first power, a second power system comprising a battery system or an engine, the second power system configured to produce a second power, a processor configured to produce an output in response to receiving an input associated with at least one of the first power system or the second power system, and a system controller configured to communicate with the first and second power systems to control a split between the first power and the second power in response to the output from the processor.

The input in the system may include power limits of the one or more fuel cell systems. The power limits of the fuel cell stack may be determined based on a mode of operation or capability of the fuel cell stack. The input in the system may include accessory demand, traction capability, or driver demand on the fuel cell powertrain system. The input in the system may include power capability or state-of-charge of the battery system. The input in the system may include information about the operating efficiency of the fuel cell stack.

The input in the system may include life or health of the power sources. The input about life or health of the power sources comprise transient limits, the minimum or maximum number of starts or stops, the state-of health, or the throughput of the power sources.

The fuel cell powertrain system may be located in a vehicle, a stationary power equipment, or a mining equipment. The fuel cell powertrain system may include a traction system or the input is a regeneration status of a traction system.

In another aspect, described herein is a method of implementing power from first and second power sources in a fuel cell powertrain system. The method may include receiving an input into a processor of the fuel cell powertrain system, determining an output by the processor, communicating the output by the processor to a system controller, and implementing a power split by the system controller, wherein the power split may be between the first power source and the second power source.

These and other features, aspects, and advantages of the present invention will become better understood when the following detailed description is read with reference to the accompanying drawings described herein. Reference is also made to the accompanying drawings that form a part hereof and in which is shown by way of illustration specific embodiments in which the invention may be practiced. These embodiments are described in sufficient detail to enable those skilled in the art to practice what is claimed and it is to be understood that other embodiments may be utilized and that logical, mechanical, and electrical changes may be made without departing from the spirit and scope of the claims. The following detailed description is, therefore, not to be taken in a limiting sense.

DETAILED DESCRIPTION

The present disclosure is directed to systems and methods of determining, optimizing, and/or improving the power split and/or allocation between more than one power source comprised in a fuel cell power system. More specifically, the present disclosure is directed to systems and methods to meet specific objectives such as life, efficiency, and/or performance of the more than one power sources in a fuel cell powertrain system. The present disclosure is also directed to methods, processes, strategies, algorithms, and/or embodiments that may result in a better control and use of the fuel cell powertrain system.

In one embodiment, the fuel cell powertrain systems described herein, may be used in a vehicle. A vehicle comprising the present fuel cell powertrain systems may be, as examples, an automobile, a passenger car/SUV, a bus, a truck, a locomotive, an aircraft, marine applications, a light duty vehicle, a medium duty vehicle, or a heavy duty vehicle, such as mining vehicles. In some embodiments, the fuel cell powertrain systems described herein may be used in vehicles used on roadways, highways, railways, airways, and/or waterways. In other embodiments, the fuel cell powertrain systems described herein may be used in other applications including but not limited to off highway vehicles, bobtails, mining equipment, stationary power systems, and/or electrolyzers.

Figure 1:
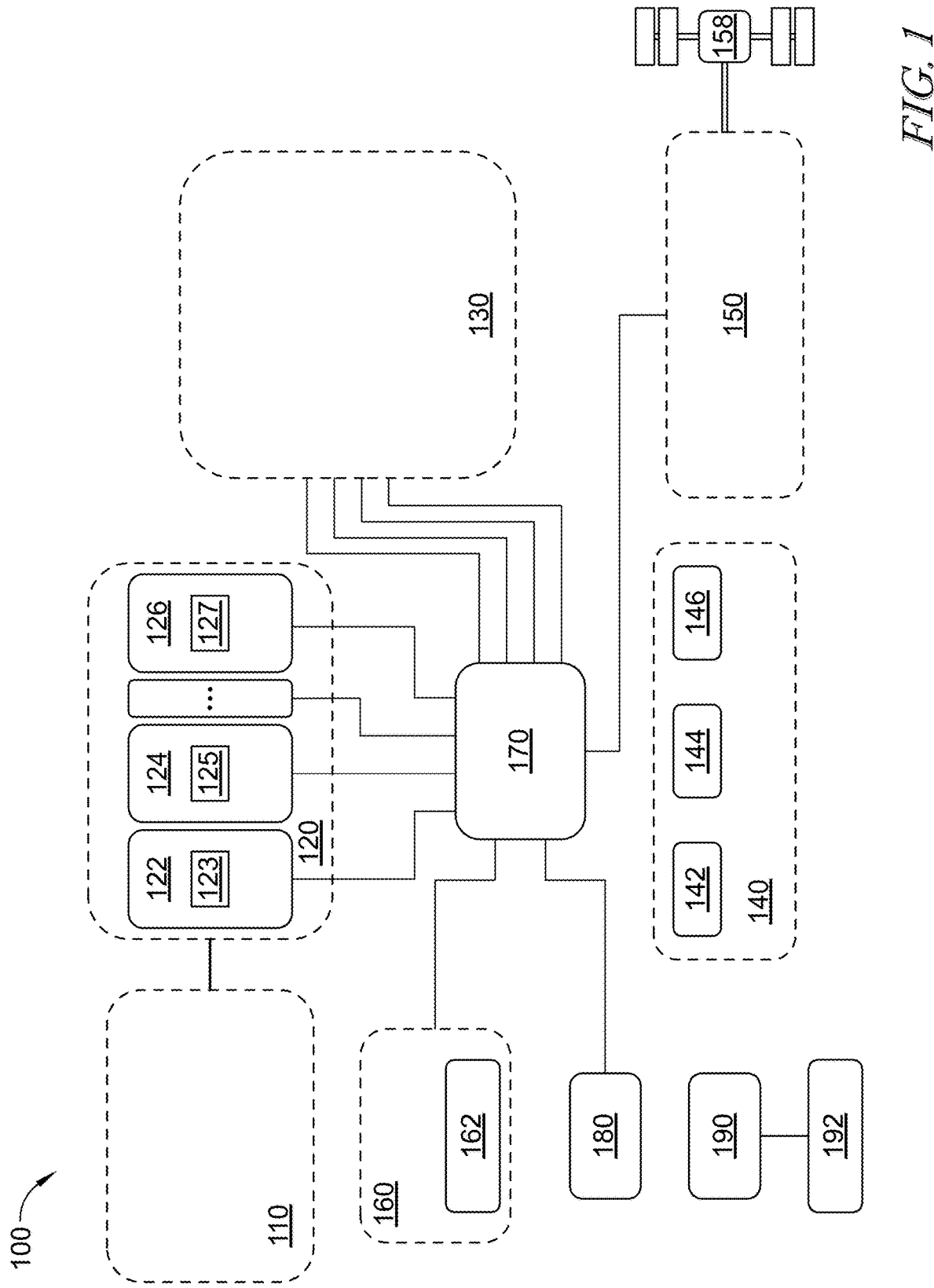
FIG. 1 is a schematic showing an exploded view of one embodiment of a fuel cell powertrain system of the present disclosure.

FIG. 1 illustrates an embodiment of a fuel cell powertrain system 100, which may be powered by one or more of any type of a power source. A power source of the present method or system may include, but is not limited to, an engine (e.g., an internal combustion engine (ICE), a diesel engine, a hydrogen powered engine, a natural gas powered engine, etc.), a fuel cell or a fuel cell stack, and/or a high voltage battery. A typical fuel cell powertrain system may comprise more than one power sources. An exemplary power source may include at least one fuel cell system and at least one high voltage battery pack.

FIG. 1 illustrates a fuel cell powertrain system 100 that comprises a fuel cell system component 120 and a high voltage battery system component 160. In one embodiment, the fuel cell system component 120 may comprise one fuel cell stack 122. In other embodiments, the fuel cell system component 120 may comprise more than one fuel cell stacks. In some embodiments, the fuel cell system component 120 may comprise 2-10 or more fuel cell systems or fuel cell stacks, including any specific number or range comprised therein. In one illustrative embodiment, the fuel cell system component 120 may comprise three fuel cell stacks or modules ("stacks") 122, 124, 126.

In one embodiment, the high voltage battery system component 160 may comprise one or more high voltage battery packs, including any number of battery packs comprised therein, such as 1, 2, 3, or more high voltage battery packs, including any number of battery packs comprised therein. In one illustrative embodiment, the high voltage battery system component 160 may comprise one high voltage battery pack 162. In another embodiment, the high voltage battery pack is one that maintains 500-800V on the high voltage DC bus.

In some embodiments, the fuel cell powertrain system 100 may comprise more than one fuel cell system in the fuel cell system component 120. In another embodiment, the fuel cell powertrain system 100 may not comprise a high voltage battery system component 160. In a further embodiment, the fuel cell powertrain system 100 may comprise power sources, such as a diesel engine and/or a hydrogen powered engine, in addition to the fuel cell system component 120 and/or the high voltage battery system component 160.

The fuel cell powertrain system 100 may further comprise one or more of a hydrogen storage system 110, an accessory system 130, a thermal management system 140, a traction system 150, a differential 158, a high voltage power distribution unit 170, an onboard charger 180, and/or a system controller 190. In some embodiments, the accessory system 130 and the driver demand (e.g., the load demanded by the driver) may comprise the load (e.g., the total load) of the fuel cell powertrain system 100. In other embodiments, the fuel cell powertrain system 100 may comprise lesser components or additional fuel cell powertrain components as indicated in FIG. 1.

In one embodiment, the thermal management system 140 may comprise one or more cooling loops. For example, the thermal management system 140 may comprise 1-10 cooling loops, including any specific number or range of cooling loops comprised therein, depending on number of fuel cell stacks. The cooling loops function to regulate the temperature of the coolant. The cooling loops may cool or reduce the heat of the coolant. In one illustrative embodiment, the thermal management system 140 may comprise three cooling loops 142, 144, 146 as shown in FIG. 1. In some embodiments, the thermal management system 140 may comprise lesser components or more additional cooling loop components. For example, in other embodiments, the thermal management system 140 may comprise lesser cooling loops 142, 144, 146 or more cooling loops 142, 144, 146.

In one embodiment, the one or more cooling loops 142, 144, 146 in the thermal management system 140 may comprise one or more means of cooling. Embodiments for a means of cooling used in the one or more cooling loop may include, but are not limited to, one of more fans (not shown), one or more chillers (not shown), and/or one or more pumps (not shown), or combinations thereof. In other embodiments, one or more cooling loops 142, 144, 146 in the thermal management system 140 may comprise lesser components or additional means of cooling components.

In some embodiments, the high voltage power distribution unit 170 may comprise of junction boxes, fuses, etc. Each component functions in the high voltage power distribution unit 170 as known in the art. In other embodiments, the onboard charger 180 may comprise power electronics and other components such as controllers, plug in ports, etc. for AC charging of the high voltage (HV) batteries. Each component functions in the onboard charger 180 as known in the art.

Referring to FIG. 1, in one embodiment, the system controller 190 may implement one or more methods, processes, strategies, and/or algorithms to determine, optimize, and/or improve a power split or a power allocation between the power sources comprised in the fuel cell powertrain system 100. Specifically, the system controller 190 may control the power split or the power allocation between the fuel cell stacks and/or the battery pack 162 comprised in the fuel cell powertrain system 100.

In one embodiment, each fuel cell stack 122, 124, 126 may comprise a fuel cell system or fuel cell stack controller 123, 125, 127 that may communicate with other fuel cell system or fuel cell stack controllers 123, 125, 127. In some embodiments, each fuel cell system or fuel cell stack controller 123, 125, 127 in each fuel cell stack 122, 124, 126 may determine, optimize, and/or improve a power split or power allocation between the fuel cell stack 122, 124, 126 and the battery pack 162.

In one illustrative embodiments, the system controller 190 may implement one or more methods, processes, strategies, or algorithms executed by a processor 192. In other embodiments, each fuel cell stack controller 123, 125, 127 in fuel cell stack 122, 124, 126 may implement one or more methods, processes, strategies, or algorithms determined, generated or identified by the system controller 190 and executed by the processor 192. The one or more methods, processes, strategies, or algorithms may be determined off line and provided as an input to the system controller 190 and executed by the processor 192. The methods, processes, strategies, or algorithms may determine, optimize, and/or improve a power split or power allocation between the fuel cell stack 122, 124, 126 and the battery pack 162.

Figure 2:
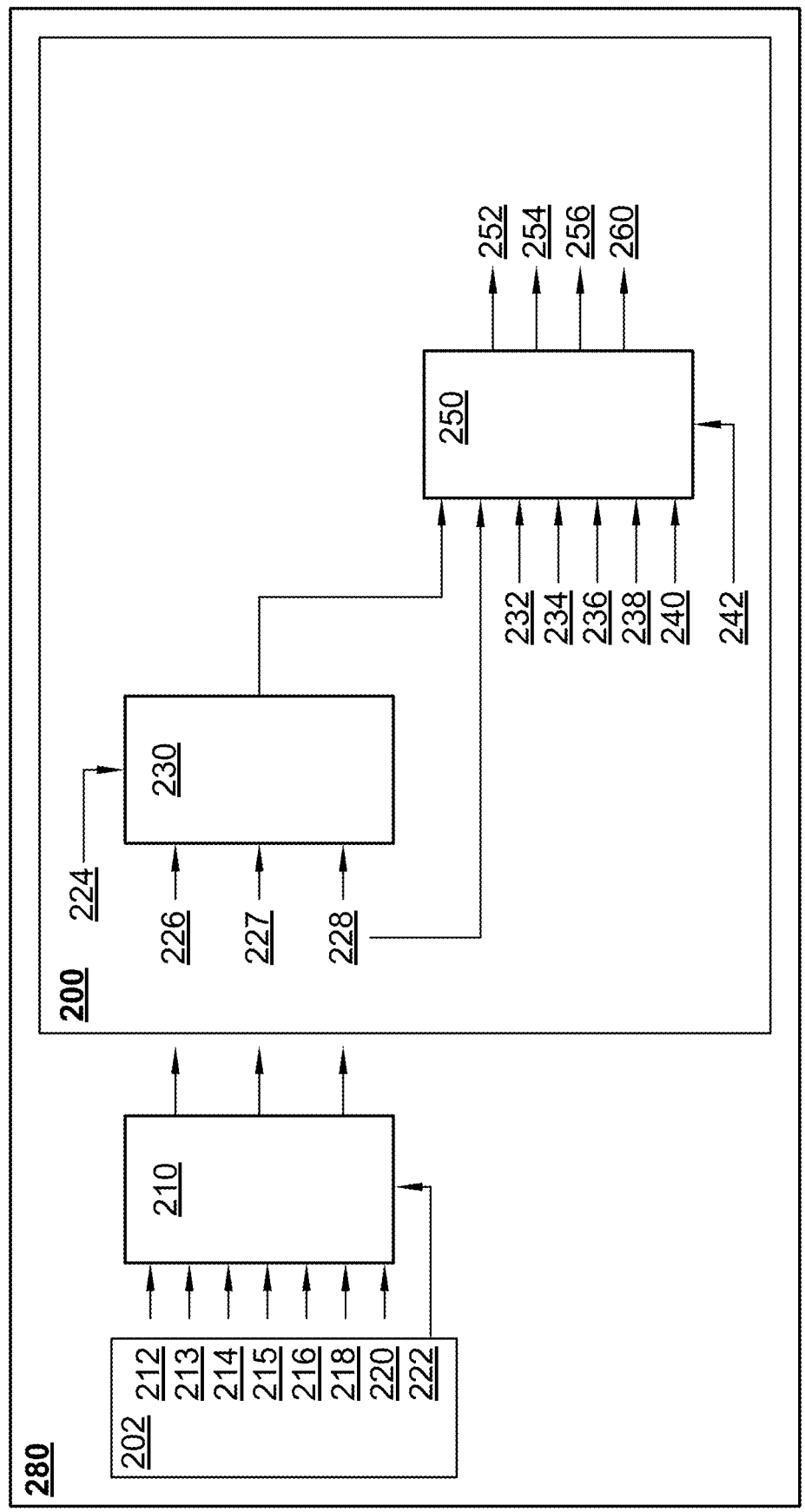
FIG. 2 is a schematic showing one embodiment of a strategy or an algorithm implemented by a system controller to split or allocate power between more than one power source in a fuel cell powertrain system.

FIG. 2 is an exemplary embodiment of a method, process, strategy, instructions, or an algorithm 200 ("strategy or algorithm") implemented by the system controller 190 or by the one or more fuel cell stack controllers 123, 125, 127 in the fuel cell stack 122, 124, 126 to split or allocate power between the more than one fuel cell stack 122, 124, 126 and the battery pack 162. Referring to FIG. 2, in one embodiment, the system controller 190 may implement a method, process, strategy, instructions, or an algorithm 200 that uses fuel cell system power limits 230 to determine, optimize, and/or improve the power split or power allocation 250 between the more than one fuel cell stack 122, 124, 126 and the battery pack 162.

In one embodiment, the mode of operation 226, 227, 228 of each of the fuel cell stack 122, 124, 126, and the fuel cell system capability 224 of each of the fuel cell stack 122, 124, 126 may affect fuel cell system power limits 230. In other embodiments, other factors, such as coolant temperature, ambient conditions, hours of use, state of health, etc. may affect the determination, optimization, and/or improvement of fuel cell system power limits 230.

Several factors may affect the power split or power allocation 250 between the fuel cell stacks 122, 124, 126 and the battery pack 162. In one embodiment, the mode of operation 226, 227, 228 of each of the fuel cell stacks 122, 124, 126 and the fuel cell system power limit 230 of the fuel cell stacks 122, 124, 126 may affect the power split or power allocation 250 between the fuel cell stacks 122, 124, 126 and the battery pack 162.

In other embodiments, factors such as accessory demand 232, traction capability 234, driver demand 236, battery power capability 238, battery state-of-charge 240, and/or other signals 242 from any vehicle comprising the fuel cell powertrain system 100 may affect the power split or power allocation 250 between the fuel cell stacks 122, 124, 126 and the battery pack 162. In some embodiments, the system controller 190 or the one or more fuel cell stack controllers 123, 125, 127 may implement the power split or power allocation 250 to comprise power demanded 252, 254, 256 from the fuel cell stacks 122, 124, 126 as well as power demanded 260 from the battery pack 162. In one embodiment, subjecting the fuel cell stacks 122, 124, 126 to excess transient operations may be harmful to the long-term life of a fuel cell stacks 122, 124, 126. While transient operations occur in a system including an internal combustion engine and a battery hybrid setup, the tradeoffs and considerations are very different in systems including fuel cell stacks 122, 124, 126. Fuel cell stacks 122, 124, 126 are more sensitive to transient loads and there could be a detrimental impact on the life of the fuel cell stacks 122, 124, 126 due an increase in transient operations. Including a battery pack 162 in such a system can be used to mitigate some of the effects of transient operations. Furthermore, it is important to be able to balance the life of the fuel cell stacks 122, 124, 126 and the battery stack 162 using power splitting strategies.

In some embodiments, transient operations may be limited by increasing the size of the fuel cell stacks 122, 124, 126 and/or increasing the size of the battery pack 162. However, in other embodiments, oversizing any of the fuel cell stacks 122, 124, 126 and/or battery pack 162 to achieve the needed life and performance may be detrimental to the value proposition of a fuel cell powertrain system 100. Thus, implementing transient operations versus appropriately sizing the fuel cell stacks 122, 124, 126 and/or battery pack 162 may be an important real-time trade-off that the system controller 190 or the one or more fuel cell system or fuel cell stack controllers 123, 125, 127 may implement to satisfy the multi-dimensional objectives of the fuel cell powertrain system 100.

In one embodiment, the system controller 190 or the one or more fuel cell stack controllers 123, 125 127 may implement various methods, processes, strategies, and/or algorithms to enforce the mode of fuel cell system operation 226, 227, 228. In some embodiments, a fuel cell powertrain system 100 operating method, process, strategy, instructions, or algorithm may include strategies such as but not limited to a strictly load-following operation strategy or algorithm, a fixed power level operation strategy or algorithm, or a bang-bang operation strategy or algorithm. These are different strategies of how the fuel cell powertrain system 100 may react to the powertrain load demand. The transient response implemented by the controller 190 would be balanced between the fuel cell stacks 122, 124, 126 and the battery stack 162 based on these different algorithms and would react differently. In one embodiment, a strictly load-following operational method, process, strategy, instructions, or algorithm may be used. Such as strategy may solves the problem of meeting transient power demand by regulating the fuel cell power to strictly follow the power demand. This would have batter transient response from the fuel cell at the expense of fuel cell stacks 122, 124, 126 life and efficiency. A strictly load-following operation may comprise the fuel cell stacks 122, 124, 126 following the load through the drive cycle dynamically. In some embodiments, if the load increases, the operation of the fuel cell stacks 122, 124, 126 may increase. This strategy makes the fuel cell stacks 122, 124, 126 react to the transient demand from the vehicle. In other embodiments, an onboard battery pack 162 may be used in certain instances such as during regeneration, peak shaving, etc.

In one embodiment, fixed power levels operational method, process, strategy, instructions, or algorithm may be used. Fixed power levels operational strategy may comprise the fuel cell stacks 122, 124, 126 operating at predefined power levels in a load-following and/or battery charge balancing manner. In some embodiments, all transitions between fixed power levels may be controlled and may not be dynamic. This is a very important strategy to improve the overall life of the fuel cell stacks 122, 124, 126. When there is transient power demand from the fuel cell powertrain system 100, the fuel cell stacks 122, 124, 126 will only react in discrete power levels and this controls how quickly and how often they respond to the power demand and thereby increasing their life. Such a strategy puts more transient loading on the battery pack 162. In other embodiments, one or more transitions between fixed power levels may be dynamic.

In some other embodiments, the battery pack 162 may work through a larger depth of discharge to accommodate the dynamics of the drive cycle. For example, if the fuel cell stacks 122, 124, 126 are to be operated at predefined power levels that are less than the load during a drive cycle, the battery pack 162 may provide the balance power that the fuel cell stacks 122, 124, 126 are unable to provide. In one embodiment, a bang-bang operational method, process, strategy, instructions, or algorithm may be used. A bang-bang operational strategy or algorithm involves the fuel cell stacks 122, 124, 126 operating at a predetermined (e.g., pre-set or predefined) fixed power level when switched on, such as at a peak efficiency power level or at an average power level. Since the fuel cell stacks 122, 124, 126 operate at different efficiencies at different power levels, this strategy involves operating the fuel cell at a power level which has the highest operating efficiency. Since the battery pack 162 is utilized a lot in this strategy, battery life may reduce with the implementation of this strategy.

One or all of these strategies could be utilized to balance the system appropriately depending on the inputs to the controller 190. The controller 190 implements a strategy or a combination of strategies that balance life of the fuel cell stacks 122, 124, 126, life of the battery stack 162, and fuel consumption as part of the total cost of operating the system 100.

A bang-bang operation may be equivalent to the fuel cell stacks 122, 124, 126 operating at a single predefined power level. In other embodiments, when the charge in the battery pack 162 is high (e.g., above about 80%), the fuel cell stacks 122, 124, 126 may turn off such that the battery pack 162 is solely responsible for powering the vehicle and/or powertrain In one embodiment, the system controller 190 or the one or more fuel cell stack controllers 123, 125, 127 may implement a method, process, strategy, instructions, or algorithm that determines and/or changes the mode of fuel cell system operation 226, 227, 228 based on the system power demand during a drive cycle. The system controller 190 or the one or more fuel cell system or fuel cell stack controllers 123, 125, 127 may also implement a method, process, strategy, instructions, or algorithm that determines and/or changes the mode of fuel cell system operation 226, 227, 228 based on the rate of change of the system power demand from one drive cycle to another, based on battery health, based on FC health, etc.

Figure 3:
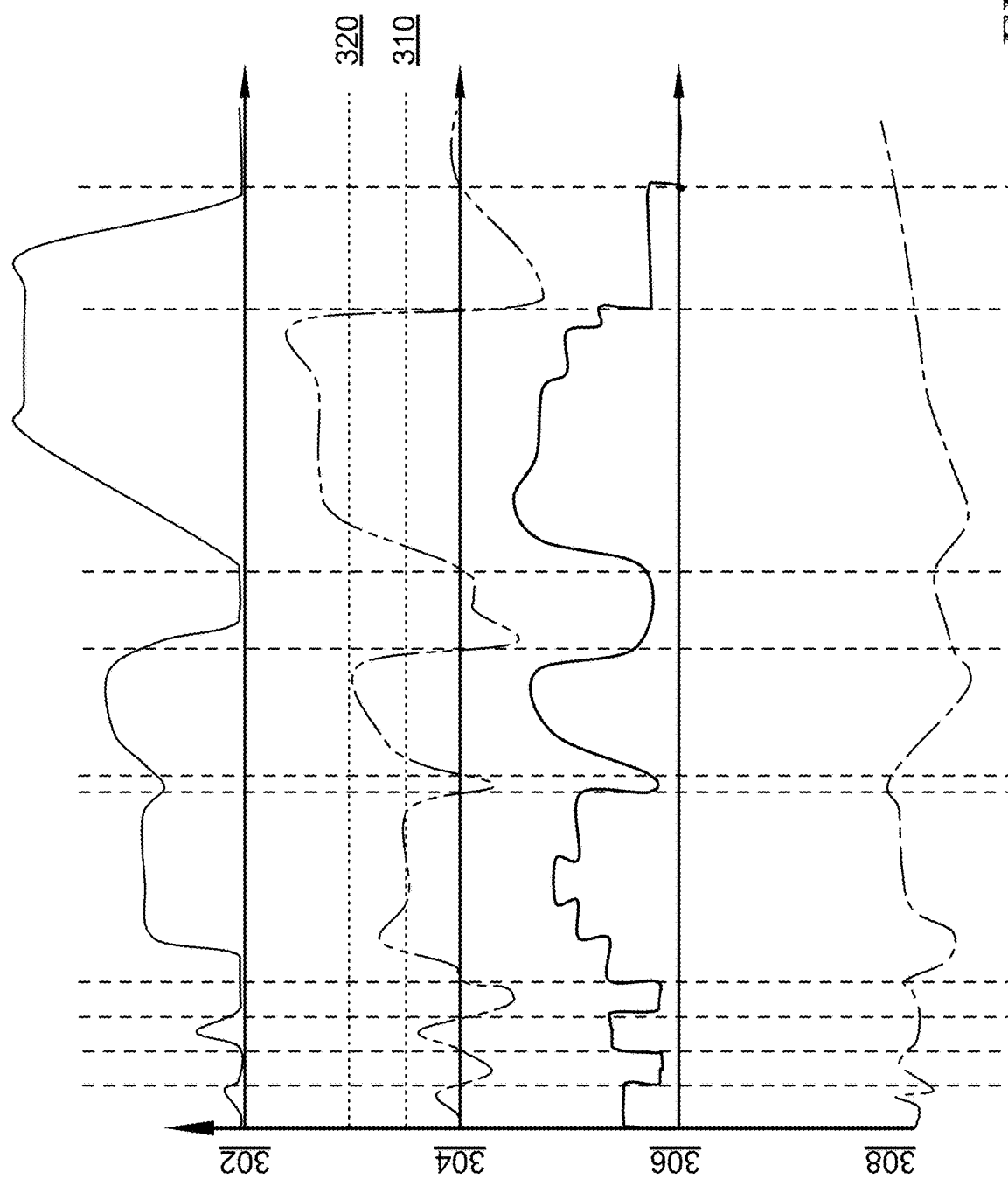
FIG. 3 is a schematic showing the performance of a vehicle comprising a fuel cell powertrain implementing one embodiment of a power split or power allocation strategy or algorithm.

FIG. 3 illustrates the performance of a vehicle comprising a fuel cell powertrain 100 when implementing one embodiment of a power split or power allocation method, process, strategy, or algorithm of the present disclosure. FIG. 3 illustrates the vehicle speed 302, the driver demand power 304, the fuel cell system power 306, and the state-of-charge (SoC) of a battery pack 308 of a vehicle comprising one embodiment of fuel cell powertrain system 100. In this embodiment, the fuel cell powertrain system 100 comprises one fuel cell stacks 122 and one battery pack 162.

When the system power demand (e.g., the driver power) 304 is below a first power threshold 310, the system controller 190 of the fuel cell powertrain system 100 or the fuel cell system or fuel cell stack controllers 123 may implement a bang-bang operation strategy or algorithm to keep the fuel cell system or fuel cell stack 122 functioning in a high efficiency region while reducing transient operations.

Referring FIG. 3, in one embodiment, when the system power demand (e.g., the driver power) 304 is above the first power threshold 310, but below a second power threshold 320, the system controller 190 of the fuel cell powertrain system 100 or the fuel cell system or fuel cell stack controller 123 may implement a strategy or algorithm that operates the fuel cell system or fuel cell stack 122 in a fixed power level operation in a load-following manner. In another embodiment, when the state-of-charge (SoC) of the battery pack 308 is below a SoC threshold (e.g., about 25%) from the nominal state-of-charge (SoC), the system controller 190 of the fuel cell powertrain system 100 or the fuel cell system or fuel cell stack controller 123 may implement a strategy or algorithm that operates the fuel cell system or fuel cell stack 122 in a fixed power level operation in a load-following manner. In some embodiments, operating the fuel cell system or fuel cell stack 122 in a fixed power level operation and/or in a load-following manner may improve the performance of the fuel cell powertrain system 100 and/or aid in maintaining charge in the battery pack 162.

In one embodiment, when the system power demand (e.g., the driver power) 304 is above the first power threshold 310, and the rate of change of power demand exceeds a change threshold (P* e.g., >about 40 kW/s) for a certain time duration such as (e.g., about 5 s to about 10 s) the system controller 190 of the fuel cell powertrain system 100 or the fuel cell system or fuel cell stack controller 123 may implement a strategy or algorithm that operates the fuel cell system or fuel cell stack 122 using a strictly load-following operation. In some embodiments, operating the fuel cell system fuel cell stack 122 in a strictly load-following manner may satisfy real-time boundary conditions on the fuel cell system or fuel cell stack 122 capability. In other embodiments, operating the fuel cell system or fuel cell stack 122 in a strictly load-following manner may improve the performance of the fuel cell powertrain system 100.

In one embodiment, the load of the fuel cell system powertrain 100 may depend on the ambient temperature. In one embodiment, the system controller 190 or the one or more fuel cell system or fuel cell stack controllers 123, 125, 127 may implement a method, process, strategy, instructions, or algorithm that determines, optimizes, and/or improves the power split or power allocation 250 between fuel cell stacks 122, 124, 126 based on the ambient temperature.

Figure 4:
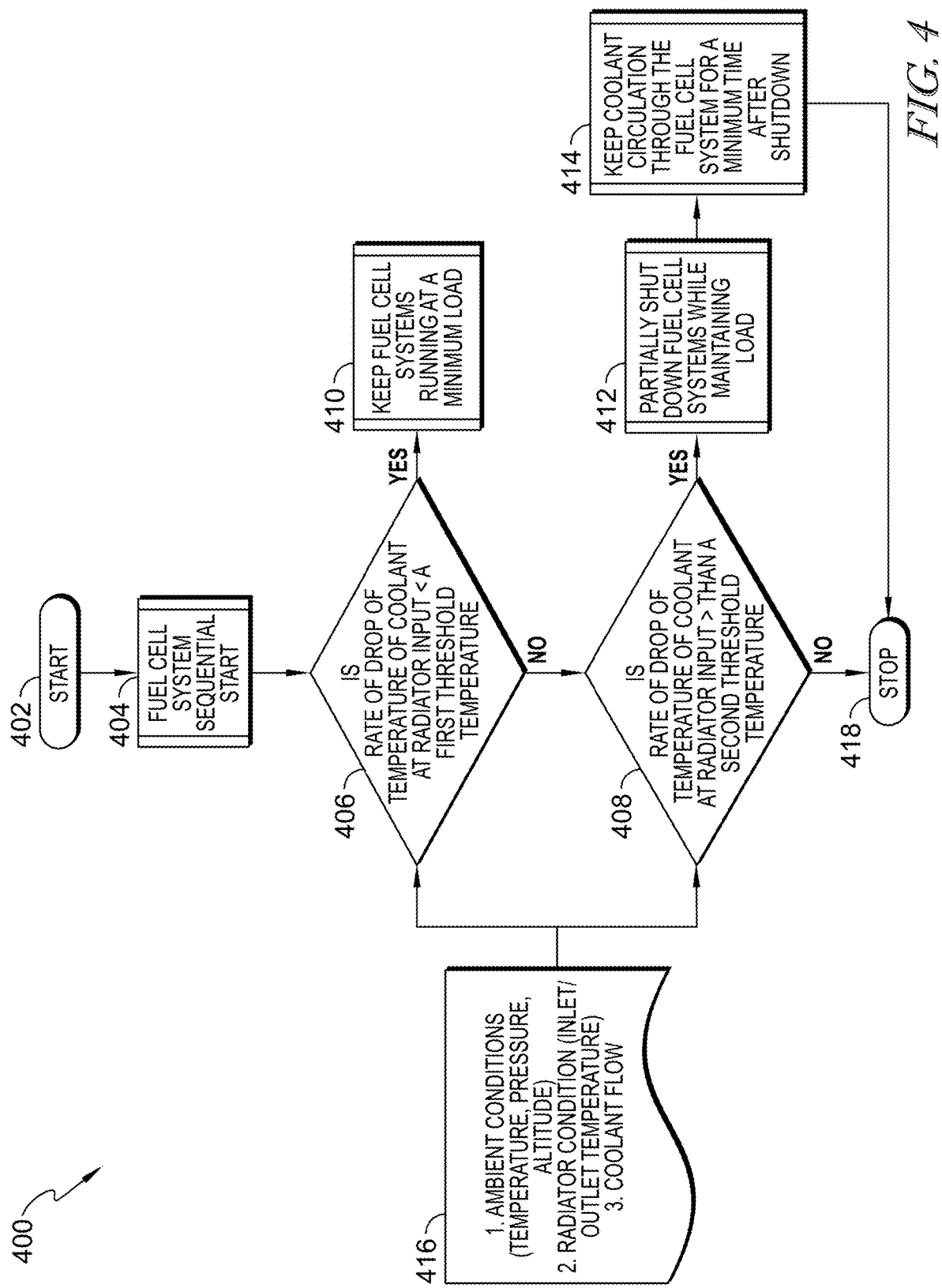
FIG. 4 is a flowchart showing one embodiment of a power split or power allocation strategy or algorithm dependent on ambient temperature of the fuel cell powertrain system.

In one embodiment, the system controller 190 or the one or more fuel cell system or fuel cell stack controllers 123, 125, 127 may implement a method, process, strategy, instructions, or an algorithm 400 comprising steps 402-414 illustrated in FIG. 4. The system controller 190 or the one or more fuel cell system or fuel cell stack controllers 123, 125, 127 may initiate the implementation of the method, process, strategy, instructions, or the algorithm 400 in step 402. In step 404, the system controller 190 or the one or more fuel cell stack controllers 123, 125, 127 may implement a strategy or algorithm that is dependent of the ambient conditions (e.g., temperature, pressure, etc.) of the fuel cell fuel cell stack 122, 124, 126. In step 406, the system controller 190 or the one or more fuel cell stack controllers 123, 125, 127 may determine while in communication with the processor 192 if the rate of drop in temperature of coolant at a radiator inlet is less than a first threshold temperature. If the rate of drop in temperature of coolant at a radiator inlet is determined to be less than the first threshold temperature, the system controller 190 or one qr more fuel cell system or fuel cell stack controllers 123, 125, 127 may execute step 410. In step 410, the system controller 190 or the one or more fuel cell stack controllers 123, 125, 127 may operate the fuel cell stacks 122, 124, 126 at a minimum load.

In step 406 of FIG. 4, if the rate of drop in temperature of coolant at a radiator inlet is determined to equal to or greater than the first threshold temperature by the processor 192, the system controller 190 or the one or more fuel cell system or fuel cell stack controllers 123, 125, 127 may execute step 408. In step 408, the system controller 190 or the one or more fuel cell system or fuel cell stack controllers 123, 125, 127 may determine while in communication with the processor 192 if the rate of drop in temperature of coolant at a radiator inlet is greater than a second threshold temperature.

In one embodiment, the system controller 190 or the one or more fuel cell system or fuel cell stack controllers 123, 125, 127 may execute steps 406, 408 based on the certain criteria listed in 416. The criteria may include the ambient conditions such as temperature, pressure, and/or altitude. The criteria may include coolant flow conditions or radiator conditions such as inlet temperature and/or outlet temperature. In some embodiments, the first threshold may be determined based on a temperature drop of about 1° C. to about a 10° C. drop per minute. In some embodiments, the second threshold may be greater than the first threshold. In other embodiments, the second threshold may be determined based on thermal inertia of the system 100. It may be selected to prevent start/stop cycling of the fuel cell fuel cell stacks 122, 124, 126.

If the rate of drop in temperature of coolant at a radiator inlet is determined to be greater than the second threshold temperature, the system controller 190 or the one or more fuel cell system or fuel cell stack controllers 123, 125, 127 may execute steps 412 and 414. In step 412, the system controller 190 or the one or more fuel cell system or fuel cell stack controllers 123, 125, 127 may partially shut down the one or more fuel cell fuel cell stacks 122, 124, 126 while maintaining the load. In step 412, the system controller 190 or the one or more fuel cell system or fuel cell stack controllers 123, 125, 127 may keep the coolant in circulation through one or more of the fuel cell fuel cell stack 122, 124, 126 for a minimum time period after the fuel cell fuel cell stack 122, 124, 126 has been shut down before ending the strategy or the algorithm 400 in step 418. If the rate of drop in temperature of coolant at a radiator inlet is determined to be equal to or lesser than the second threshold temperature by the processor 192, the system controller 190 or the one or more fuel cell system or fuel cell stack controllers 123, 125, 127 may end the strategy or the algorithm 400 in step 418.

Referring back to FIG. 2, in one embodiment, the system controller 190 or the one or more fuel cell system or fuel cell stack controllers 123, 125, 127 may implement a method, process, strategy, instructions, or an algorithm 280 that uses a life based mode of operation 210. This life based mode of operation 210 are used by the system controller 190 or by the one or more fuel cell system or fuel cell stack controllers 123, 125, 127 in addition to fuel cell system power limits 230 to determine, optimize, and/or improve the power split or power allocation 250 between the more than one fuel cell stacks 122, 124, 126 and the battery pack 162.

Through normal operations, fuel cell systems, or fuel cell stacks 122, 124, 126 and battery packs 162 continuously age, degrade, and/or deteriorate over time. Aging, degradation, and/or deterioration often reduce or prevent fuel cell stacks 122, 124, 126 and battery packs 162 from providing optimal power. Aging, degradation, and/or deterioration often reduce or prevent fuel cell stacks 122, 124, 126 and battery packs 162 from efficiently operating over their respective lifetime or lifespan.

In one embodiment, methods and systems for determining, optimizing, applying, and/or managing the state-of-health (SOH) and/or the lifespan of fuel cell stacks 122, 124, 126 and the battery packs 162 may be implemented in determining, optimizing, and/or improving the power split or power allocation 250 in a fuel cell system powertrain 100. In some embodiments, the state-of-health (SOH) and the lifespan of the fuel cell stacks 122, 124, 126 in a fuel cell system powertrain 100 may be similar to ensure optimal efficiency and performance.

In one embodiment, several inputs or control elements 202 may influence the life based mode of operation 210 of the fuel cell stacks 122, 124, 126 and the battery pack 162. In one embodiment, mode of operation 226, 227, 228 of each of the fuel cell stacks 122, 124, 126 may be determined by factors including: 1) system transient limits 212 of the fuel cell stacks 122, 124, 126, 2) the minimum power limits 213 of the fuel cell stacks 122, 124, 126, 3) the number of starts and/or stops per hour 214 of the fuel cell stacks 122, 124, 126, 4) time allowed at peak power 215 of the fuel cell stacks 122, 124, 126, 5) the state-of-health 216 of the fuel cell stacks 122, 124, 126, 6) the battery throughput 218 of the battery pack 162, 7) the state-of-health 220 of the battery pack 162, and/or 8) throughput 222 of the fuel cell stacks 122, 124, 126. In other embodiments, the strategy or the algorithm 280 may comprise lesser inputs or control elements 202 or more additional inputs or control elements 202.

The inputs or control elements 202 may be entered or received by the controller 190, the one or more fuel cell stack controllers 123, 125, 127, and/or the processor 192. The inputs or control elements 202 may be also or further incorporated into the method, process, strategy, instructions, or algorithm determined or executed by the processor 192 in order to generate and/or estimate the life based mode of operation 210 of the fuel cell stacks 122, 124, 126 and the battery packs 162.

In one embodiment, the inputs or the control elements 202 may be entered automatically or manually by a user, operator, or a controller into the controller 190 or processor 192. The inputs or the control elements 202 may include mathematical formulas, strategies, or algorithms. In other embodiments, the inputs or the control elements 202 may be accessible via publicly or privately available information. In some other embodiments, the inputs or the control elements 202 may be determined in real time. In some embodiments, the inputs or the control elements 202 may be determined by a combination of real time processing and operator or predetermined inputs. The formulas, strategies, or algorithms may process and/or manipulate the quantitative or qualitative inputs or control elements 202, to generate a life based mode of operation 210.

In one embodiment, the mode of operation 226, 227, 228 of each of the fuel cell stacks 122, 124, 126 may be determined based on the life based mode of operation 210. In one embodiment, the mode of operation 226, 227, 228 of each of the fuel cell stacks 122, 124, 126 is generated or identified based on the life based mode of operation 210 and the fuel cell system capability 224 of each of the fuel cell system or fuel cell stack 122, 124, 126 may be used to determine fuel cell system or fuel cell stack 122, 124, 126 power limits 230. In other embodiments, other factors such as may affect the determination and/or optimization of fuel cell system power limits 230.

In one embodiment, in addition to the power demand based determination of the mode of operation 226, 227, 228 of the fuel cell system or fuel cell stack 122, 124, 126, the life and state-of-health (SOH) of each of the fuel cell system or fuel cell stack 122, 124, 126 and battery pack 162 may influence the real time power split or power allocation 250. In some embodiments, life based modifications to the power split or power allocation 250 may ensure longevity of the fuel cell powertrain system 100 and/or balance the life of the battery pack 162 and the life of each of the fuel cell stacks 122, 124, 126. The system controller 190 or the one or more fuel cell stack controllers 123, 125, 127 may consider this balance of life between power sources while determining, optimizing, implementing, and/or improving a power split or power allocation 250 strategy or algorithm that may be able to target maximum efficiency of the fuel cell powertrain system 100. In some embodiments, the system controller 190 or the one or more fuel cell system or fuel cell stack controllers 123, 125, 127 may implement methods to estimate or predict the health of each of the one or more fuel cell system or fuel cell stack 122, 124, 126 and/or the battery pack 162 onboard the vehicle.

The life based modifications to the power limit 230 of each of the fuel cell stacks 122, 124, 126 based on different inputs or control elements 202 may cause the system controller 190 or the one or more fuel cell system or fuel cell stack controllers 123, 125, 127 to implement a power split or power allocation strategy or algorithm in the fuel cell powertrain system 100 such that the fuel cell powertrain system 100 may switch between more than one pre-defined operational strategies or one or more power sources. For example, in some embodiments, a moderate strategy or algorithm may comprise an operational strategy that may allow the fuel cell powertrain system 100 more flexibility than a nominal or minimal strategy or algorithm. In some embodiments, a moderate strategy or algorithm may comprise one or more of the inputs or the control elements 202, such as slow transient limits, a high minimum power limit, limited time at peak power, throughput energy and/or may regulate the start/stop of the fuel cell stacks 122, 124, 126. In other embodiments, a nominal or minimal strategy or algorithm may allow for nominally set transient operation, and may switch to a lower minimum power during regeneration, may comprise no limit for peak power operation, and/or may not regulate the start/stop of the fuel cell stacks 122, 124, 126.

In one embodiment, the system controller 190 or the one or more fuel cell system or fuel cell stack controllers 123, 125, 127 may have the ability to additionally tune, tailor, or change the individual inputs or control elements 202 of the moderate strategy or algorithm through real time estimation. In other embodiments, the system controller 190 or the one or more fuel cell system or fuel cell stack controllers 123, 125, 127 may switch between predefined levels for the individual inputs or control elements 202. In some embodiments, the ability to additionally tune the individual inputs or control elements 202 of the moderate strategy or algorithm may be based on the difference in the state-of-health (SOH) of the battery pack 162 and the state-of-health (SOH) of each of the fuel cell stacks 122, 124, 126.

Figure 5:
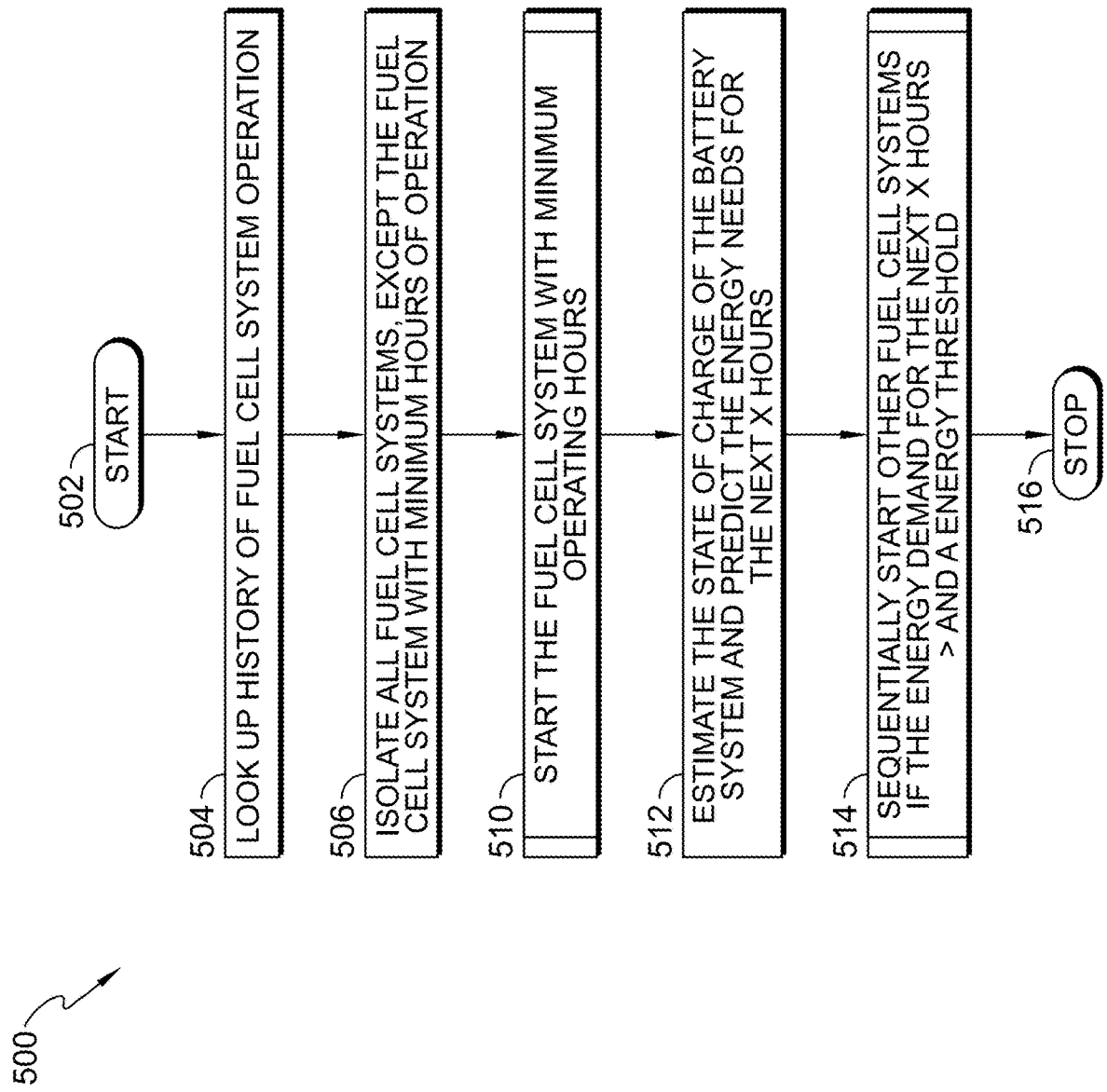
FIG. 5 is a flowchart showing one embodiment of a power split or power allocation strategy or algorithm dependent on operating hours of the more than on fuel cell systems in the fuel cell powertrain system.

In one embodiment, the system controller 190 or the one or more fuel cell system or fuel cell stack controllers 123, 125, 127 may implement a method, process, strategy, instructions, or algorithm that determines, optimizes, implements, and/or improves the power split or power allocation 250 between fuel cell stacks 122, 124, 126 based on the hours of operation of the fuel cell stacks 122, 124, 126. In one embodiment, the system controller 190 or the one or more fuel cell system or fuel cell stack controllers 123, 125, 127 may implement a strategy or an algorithm 500 comprising steps 502-16 illustrated in FIG. 5. The system controller 190 may initiate the strategy or the algorithm 500 in step 502.

In step 504, the system controller 190 or the one or more fuel cell system or fuel cell stack controllers 123, 125, 127 may communicate with the processor 192 to identify the history of the fuel cell stacks 122, 124, 126 runtime. In step 506, the system controller 190 or the one or more fuel cell system or fuel cell stack controllers 123, 125, 127 may isolate all fuel cell stacks 122, 124, 126 except the one fuel cell system with minimum hours of operation. In step 508, the system controller 190 or the one or more fuel cell system or fuel cell stack controllers 123, 125, 127 may start the fuel cell system or fuel cell stack 122, 124, 126 with minimum operating hours. In step 510, once the first fuel cell system or fuel cell stack 122, 124, 126 reaches a predetermined temperature depending the type and/or composition of the fuel cell system or fuel cell stack 122, 124, 126 the system controller 190 or the one or more fuel cell fuel cell stack controllers 123, 125, 127 may start the fuel cell system or fuel cell stack 122, 124, 126 having the second least operating hours.

In step 512, the system controller 190 or the one or more fuel cell system or fuel cell stack controllers 123, 125, 127 may communicate with the processor 192 to estimate the state-of-charge (SoC) and/or predict energy needed for a time period. For example, an illustrative time period for which energy may be required by the fuel cell powertrain system 100 may range from about 10 minutes to about 2 hours, including any specific or range of time comprised therein. In step 514, the system controller 190 or the one or more fuel cell system or fuel cell stack controllers 123, 125, 127 may sequentially start other fuel cell stacks 122, 124, 126 if the energy demand (kWh) for the next 10 minutes to about 2 hours is greater than an energy threshold which is dependent on the component selection based on the truck but typically may be about 5% to about 10% of rated power, including any specific percentage or range comprised therein.

The one or more fuel cell stacks 122, 124, 126 of the present disclosure may include, but are not limited to, one or more fuel cells. The fuel cells of the one or more fuel cell stacks 122, 124, 126 may include, but are not limited to a phosphoric acid fuel cell (PAFC), a molten carbonate fuel cell (MCFC), a proton exchange membrane fuel cell (PEMFC), and a solid oxide fuel cell (SOFC). In one exemplary embodiment, the one or more fuel cell stacks 122, 124, 126 are SOFC or PEMFC systems.

A PEMFC system typically has a positive minimum power draw (e.g., a minimum power limit) 213 required when the fuel cell system or fuel cell stack 122, 124, 126 is operating. In one embodiment, the minimum power may be the idle power of the fuel cell system or fuel cell stack 122, 124, 126. In some embodiments, the minimum power may not be the peak efficiency of the fuel cell system or fuel cell stack 122, 124, 126, but may be the minimum power required to ensure stable operation and to avoid detrimental effects to the life of the fuel cell system or fuel cell stack 122, 124, 126.

In one embodiment, in a fuel cell powertrain system 100 comprising more than one PEMFC systems 122, 124, 126, it may be beneficial to operate each of the fuel cell system or fuel cell stack 122, 124, 126 at a peak efficiency point. Doing so helps to ensure a higher efficiency for the fuel cell powertrain system 100. In some embodiments, each of the fuel cell system or fuel cell stack 122, 124, 126 may operate at the peak efficiency, as long as the battery pack 162, loads, and drive cycle permit such operation.

In one embodiment, in addition to life based modifications 210 to the power limit, the system controller 190 of the fuel cell powertrain system 100 or the one or more fuel cell system or fuel cell stack controllers 123, 125, 127 may also implement additional strategies or algorithms involving other components of the fuel cell powertrain system 100 to influence the power limits. In some embodiments, the power split or power allocation 250 between the fuel cell stacks 122, 124, 126 and battery pack 162 may be based on a regeneration mode of the traction system 150.

In one embodiment, when life of the fuel cell stacks 122, 124, 126 is within a nominal range, the system controller 190 or the one or more fuel cell system or fuel cell stack controllers 123, 125, 127 may operate the fuel cell stacks 122, 124, 126 at a minimum power. This minimum power is the peak efficiency point when a traction motor 154 is in traction mode. In other embodiments, when life of the fuel cell stacks 122, 124, 126 is within a nominal range, the traction motor 154 is in traction mode, and the state-of-charge (SoC) of the battery pack 162 and/or the charge limits of the battery pack 162 are not able to sustain the operation of the fuel cell stacks 122, 124, 126 at peak efficiency, the system controller 190 or the one or more fuel cell system or fuel cell stack controllers 123, 125, 127 may increase/decrease accessory loads. Specifically, the fuel cell stacks 122, 124, 126 may increase/decrease accessory loads by increasing or decreasing the set point cabin temperature of the vehicle with the fuel cell powertrain system 100 by a few degrees. In some embodiments, the accessory loads may be increased or decreased by overcooling the battery pack 162, and/or by overcooling the power electronics system and/or overcooling the fuel cell system.

In some embodiments, the system controller 190 or the one or more fuel cell system or fuel cell stack controllers 123, 125, 127 may choose to turn off one or more of the fuel cell stacks 122, 124, 126 for a time period, if the system power demand is lower than the total fuel cell power capability. In some embodiments, the system controller 190 or the one or more fuel cell system or fuel cell stack controllers 123, 125, 127 may determine which fuel cell stacks 122, 124, 126 to shutdown based on the health of individual fuel cell stacks 122, 124, 126 in order to balance the life of various fuel cell stacks 122, 124, 126 onboard the powertrain.

In one embodiment, the system controller 190 or the one or more fuel cell system or fuel cell stack controllers 123, 125, 127 may choose to cycle through the fuel cell system or fuel cell stacks 122, 124, 126 until there are enough fuel cell stacks 122, 124, 126 operating at a historical average power in the key cycle. The historical average power in the key cycle is the average power over a period of operation. In some embodiments, the period of operation may be range from about 30 minutes to about 5 hours, including any time period comprised therein. In some embodiments, the period of operation may be about 1 hour, about 2 hours, or about 4 hours. To further meet the required power demand, the system controller 190 may also turn off one or more of the fuel cell stacks 122, 124, 126 instead of operating that particular fuel cell stacks 122, 124, 126 at idle power.

In one embodiment, when life of the fuel cell stacks 122, 124, 126 is within a nominal range, the traction system 150 is in regeneration mode, and the speed of the vehicle comprising the fuel cell powertrain system 100 is above a calibratable speed threshold. The threshold may range from about 20 mph to about 40 mph, including any speed comprised therein. The system controller 190 or the one or more fuel cell system or fuel cell stack controllers 123, 125, 127 may ramp down the output of the fuel cell stacks 122, 124, 126 to an idle power. In some embodiments under these circumstances, the system controller 190 or the one or more fuel cell system or fuel cell stack controllers 123, 125, 127 may ramp the output of fuel cell stacks 122, 124, 126 to a lower power level than idle power for a limited duration. In some embodiments under these circumstances, the system controller 190 may shut down one or more of the fuel cell stacks 122, 124, 126. This may allow the traction system 150 to operate at a higher power leading to a higher overall efficiency of the fuel cell powertrain system 100.

In some embodiments, the system controller 190 or the one or more fuel cell system or fuel cell stack controllers 123, 125, 127 may overcool the power electronics of the fuel cell stacks 122, 124, 126 by a few degrees. In some embodiments, overcooling the power electronics of the fuel cell stacks 122, 124, 126 comprises increasing a cooling system pump speed. In other embodiment, overcooling the power electronics occurs by running one or more fans in one or more cooling loops 142, 144, 146 in the thermal management system 140 at maximum speed.

In other embodiments, the system controller 190 or the one or more fuel cell system or fuel cell stack controllers 123, 125, 127 may overcool the battery system component 160 by a few degrees. In some embodiments, overcooling the battery system component 160 comprises operating one or more chillers or coolers. For example, a chiller or cooler (not shown) may be located in one or more cooling loops 142, 144, 146 in the thermal management system 140. In additional embodiments, overcooling the battery system component 160 comprises operating one or more fans in the one or more cooling loops 142, 144, 146. For example, the chiller, coolers, pumps, and fans of the thermal management system 140 may be operated at maximum speed. In a further embodiment, the chiller, coolers, pumps, and fans of the one or more cooling loops 142, 144, 146 in the thermal management system 140 may be operated at maximum speed.

In one embodiment, the power split or power allocation 250 between the fuel cell stacks 122, 124, 126 and battery pack 162 may be based on the efficiency of the fuel cell stacks 122, 124, 126 and/or battery pack 162. In some embodiments, the system controller 190 of the fuel cell powertrain system 100 or the one or more fuel cell system or fuel cell stack controllers 123, 125, 127 may not equally distribute the power between the fuel cell stacks 122, 124, 126 and the battery pack 162.

In one embodiment, in addition to regeneration-based and life- or health-based power limit modifications, the system controller 190 of the fuel cell powertrain system 100 or the one or more fuel cell system or fuel cell stack controllers 123, 125, 127 may implement methods, processes, strategies, or algorithms that will allocate the power to various fuel cell stacks 122, 124, 126 and battery pack 162 based on the efficiency curve and/or performance of the fuel cell stacks 122, 124, 126 and battery pack 162.

In one embodiment of a charge-sustaining fuel cell powertrain system 100, the fuel cell stacks 122, 124, 126 and battery pack 162 may satisfy the following conditions.

$$P_{fc1}+P_{fc2}+\ldots+P_{fcn}=P_{traction}+P_{acc}+\alpha P_{battSustain}$$

Alpha ($\alpha$) is a tunable, tailorable, and dynamic parameter that determines the aggressiveness with which the system controller 190 of the fuel cell powertrain 100 or the one or more fuel cell system or fuel cell stack controllers 123, 125, 127 may charge the battery pack 162 to sustain operations (e.g., optimal operations) of the fuel cell powertrain system 100. $P_{fc1}$ is the power of a first fuel cell system, $P_{fc2}$ is the power of a second fuel cell system, $P_{fcn}$ is the power of a Nth fuel cell system, $P_{traction}$ is the traction power, $P_{acc}$ is the accessory power, and $P_{battSustain}$ is the battery charge power required.

Referring to FIGS. 1 and 2, in one embodiment, if the efficiency of each of the fuel cell stacks 122, 124, 126 is known, the mode of operation 226, 227, 228 of the fuel cell stacks 122, 124, 126 are known. If modifications to power limits of the fuel cell stacks 122, 124, 126 are also known, the system controller 190 or the one or more fuel cell system or fuel cell stack controllers 123, 125, 127 may implement an online or offline method, process, strategy, instructions, or algorithm to estimate the ideal power split between the more than one fuel cell stacks 122, 124, 126 and/or battery pack 162 for maximum system efficiency.

The online embodiment of the strategy or algorithm may be stored in a memory device accessible to the system controller 190 or the one or more fuel cell system or fuel cell stack controllers 123, 125, 127. In other embodiments, the system controller 190 or the one or more fuel cell system or fuel cell stack controllers 123, 125, 127 may implement a real-time strategy or algorithm to estimate the ideal power split between the more than one fuel cell stacks 122, 124, 126 and/or battery pack 162 for maximum system efficiency. In other embodiments, the system controller 190 or the one or more fuel cell stack controllers 123, 125, 127 may predict, identify, or generate a strategy or algorithm to estimate the ideal power split between the more than one fuel cell stacks 122, 124, 126 and/or battery pack 162 for maximum system efficiency.

Figure 6:
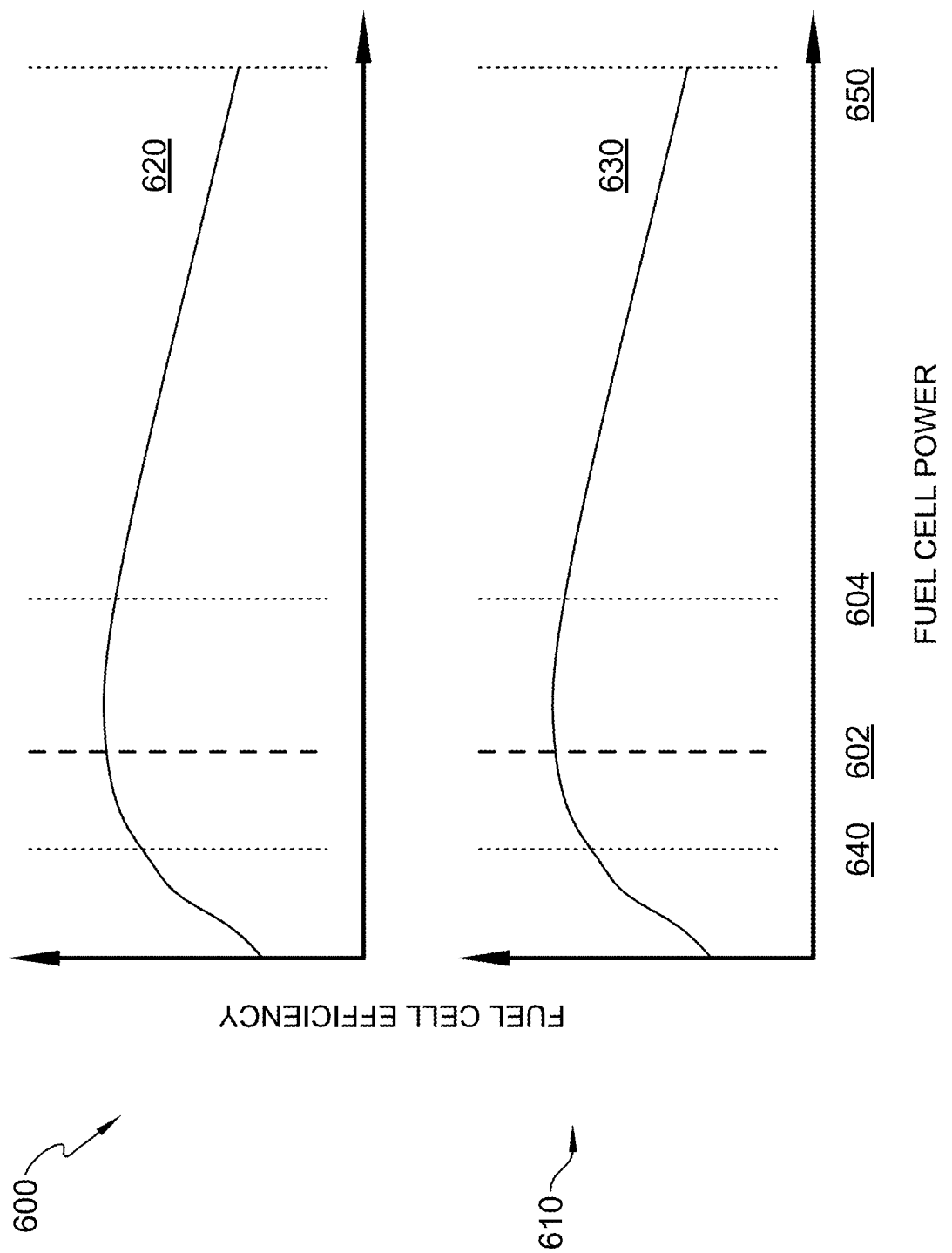
FIG. 6 are graphs showing one embodiment of a power split or power allocation strategy or algorithm in a fuel cell powertrain system comprising two fuel cell systems based on the total power demand and the efficiency curves of the two fuel cell systems.

For example, in one embodiment, a fuel cell powertrain system 100 may comprise two fuel cell systems or fuel cell stacks 122, 124. A rule-based method, process, or approach that identifies the power split or power allocation based on the total power demand and the efficiency curves of the two fuel cell stacks 122, 124 is shown in FIG. 6. Graphs 600 and 610 show the efficiency curve 620 for the fuel cell system or fuel cell stack 122, the efficiency curve 630 for the fuel cell system or fuel cell stack 124. As shown in the efficiency curves 620 and 630, if the total power demand is less than two times (2×) a first threshold 602 and the conditions laid out previously on fuel cell system and battery life, start/stop, etc. hold true, the system controller 190 or the one or more fuel cell system or fuel cell stack controllers 123, 125 may operate both fuel cell systems at the first threshold 602 and store energy from excess power in the battery pack 162 until the state-of-charge (SoC) of the battery pack 162 reaches a calibratable maximum value (e.g., until a is 0 or a is about 80%). After the state-of-charge (SoC) of the battery pack 162 reaches a calibratable maximum value, the fuel cell systems, or fuel cell stacks 122, 124 may be turned off.

If total power demand is higher than two times (2×) the first threshold 602 but lower than two times (2×) a second threshold 604, and the battery pack 162 may provide the deficit power, the system controller 190 or the one or more fuel cell system or fuel cell stack controllers 123, 125, 127 may operate both fuel cell fuel cell stacks 122, 124 at the first threshold 602. The fuel cell stacks 122, 124 may then use the battery pack 162 to provide the deficit power until the battery pack 162 reaches a calibratable min value. Alpha (a) is a rubber-band like function that increases as the state-of-charge (SoC) of the battery pack 162 deviates further away from its nominal state-of-charge (SoC). In one embodiment, the power deficit is as follows.

$$\text{Power deficit} = \text{Power demand} - (2*\text{first threshold})$$

As the battery pack 162 reaches a calibratable minimum value, the power demand may automatically go beyond two times (2×) the first threshold 602. If the battery pack 162 cannot provide the requisite deficit power, the system controller 190 or the one or more fuel cell system or fuel cell stack controllers 123, 125 may split power between the two fuel cells stacks 122, 124 equally. If total power demand is higher than two times (2×) the second threshold 604, the system controller 190 or the one or more fuel cell system or fuel cell stack controllers 123, 125 may split power between the two fuel cells stacks 122, 124 equally. Alternatively, the system controller 190 or the one or more fuel cell system or fuel cell stack controllers 123, 125 may split power between the two fuel cells stacks 122, 124 unequally. Additionally, the system controller 190 or the one or more fuel cell system or fuel cell stack controllers 123, 125 may split power between the fuel cells stacks 122, 124 and the battery pack 162 equally or unequally.

In one embodiment, the first threshold 602 may be about 20% to about 30% of peak power 650 of the fuel cell system, including every percentage comprised therein. In one embodiment, the second threshold 604 may be about 30% to about 40%, or about 40% to about 50% of peak power 650 of the fuel cell stacks 122, 124, 126, including every percentage comprised therein. The minimum power of operating is denoted by 640. In other embodiments, the first threshold 602 and the second threshold 604 may vary depending on the characteristics of the relevant fuel cell stacks 122, 124, 126.

Figure 7:
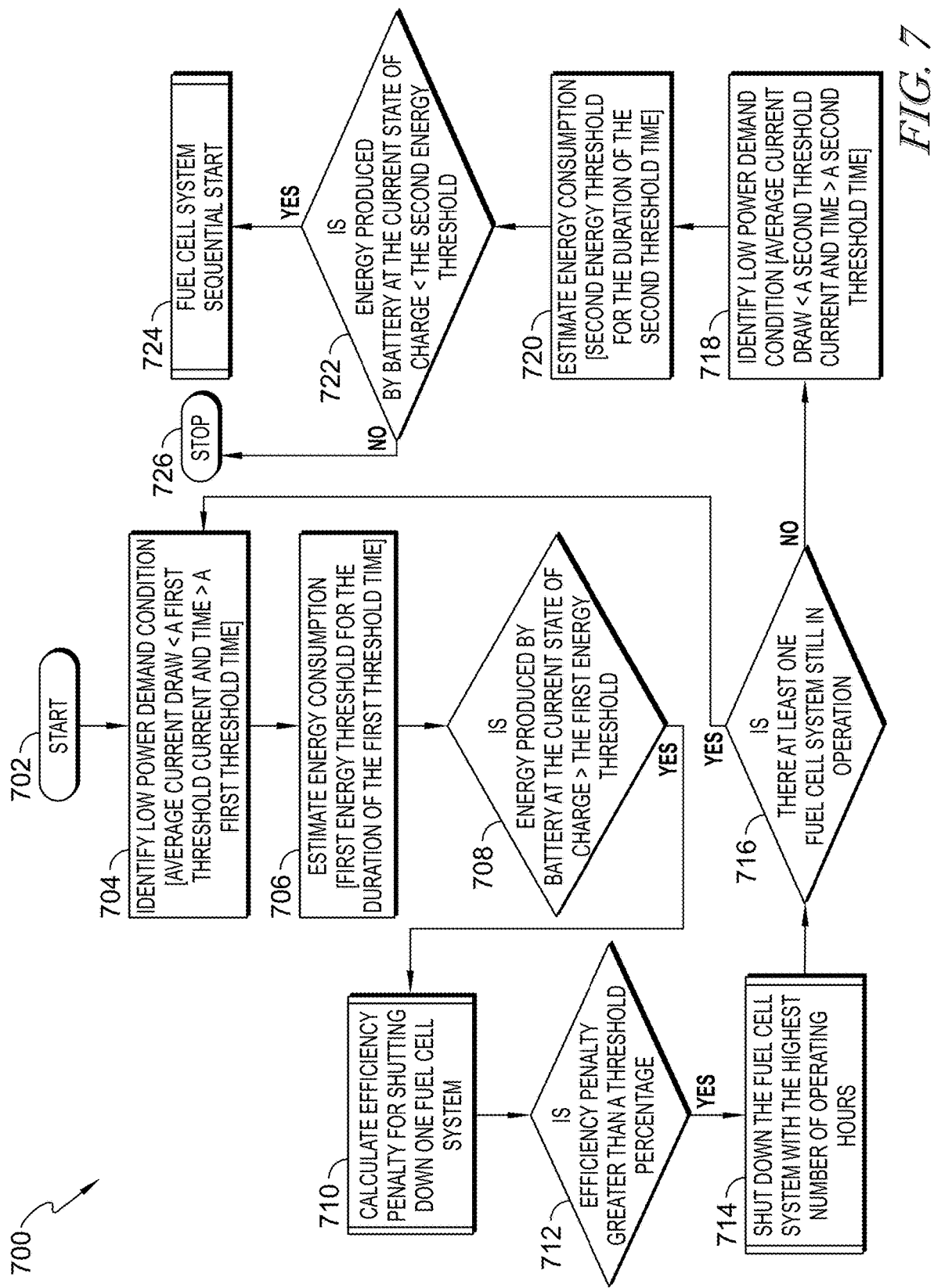
FIG. 7 is a flowchart showing one embodiment of a power split or power allocation strategy or algorithm in a fuel cell powertrain system comprising more than one fuel cell systems and at least one battery pack.

In one embodiment, the system controller 190 or the one or more fuel cell system or fuel cell stack controllers 123, 125, 127 may implement a method, process, strategy, instructions, or algorithm 700 comprising steps 702-722 illustrated in FIG. 7. The system controller 190 may initiate the strategy or the algorithm 700 in step 702. In step 704, the system controller 190 or the one or more fuel cell system or fuel cell stack controllers 123, 125, 127 may communicate with the processor 192 to identify low power demand conditions.

In some embodiments, the low power demand conditions may comprise conditions when the average current draw from the one or more power sources is less than a first threshold 602 current and/or when the time of power draw is greater than a first threshold 602 time period. In step 706, the system controller 190 or the one or more fuel cell system or fuel cell stack controllers 123, 125, 127 may communicate with the processor 192 to estimate energy consumption (e.g., a first energy threshold for the duration of the time period defined by the first threshold time).

In step 708 of FIG. 7, the system controller 190 or the one or more fuel cell system or fuel cell stack controllers 123, 125, 127 may communicate with the processor 192 to determine if the energy of the battery pack (kWh) at the current state-of-charge (SoC) is greater than the first energy threshold estimated in step 706. If the energy of the battery pack (kWh) 162 at the current state-of-charge (SoC) is greater than the first energy threshold 602 estimated in step 706, the system controller 190 or the one or more fuel cell system or fuel cell stack controllers 123, 125, 127 may execute steps 710 and 712. In some embodiments, the first energy threshold may be dependent on the power rating for fuel cell fuel cell stack 122, 124, 126, and/or battery pack 162 used in the system 100.

In step 710, the system controller 190 or the one or more fuel cell system or fuel cell stack controllers 123, 125, 127 may calculate the efficiency penalty for shutting down one fuel cell system or fuel cell stack 122, 124, 126. In step 712, the system controller 190 or the one or more fuel cell system or fuel cell stack controllers 123, 125, 127 may determine if the efficiency penalty is greater than a threshold percentage. If the efficiency penalty is greater that the threshold percentage, the system controller 190 or the one or more fuel cell system or fuel cell stack controllers 123, 125, 127 may shut down the fuel cell system or fuel cell stack 122, 124, 126 having the highest number of operating hours in step 714 and execute step 716.

In step 712 of FIG. 7, the system controller 190 or the one or more fuel cell system or fuel cell stack controllers 123, 125, 127 may communicate with the processor 192 to determine if there is at least one fuel cell stacks 122, 124, 126 in operation. If there is at least one fuel cell system or fuel cell stack 122, 124, 126 still in operation, the system controller 190 may execute all the steps of FIG. 7 starting with step 704. If there is no fuel cell system or fuel cell stack 122, 124, 126 still in operation, the system controller 190 or the one or more fuel cell system or fuel cell stack controllers 123, 125, 127 may execute step 714. In some embodiments, the threshold percentage may be dependent on the age of the fuel cell fuel cell stack 122, 124, 126. In other embodiments, the threshold percentage may be based on the efficiency tradeoff depending on the specific system 100 application.

In step 714 of FIG. 7, the system controller 190 or the one or more fuel cell system or fuel cell stack controllers 123, 125, 127 may communicate with the processor 192 to identify low power demand conditions. In some embodiments, the low power demand conditions may comprise conditions when the average current draw is less that a second threshold 604 current and/or when the time period of the current draw is greater than a second threshold 604 time.

In step 716 of FIG. 7, the system controller 190 or the one or more fuel cell system or fuel cell stack controllers 123, 125, 127 may communicate with the processor 192 to estimate energy consumption (e.g., a second energy threshold) during the time period defined by the second threshold time. In step 718, the system controller 190 or the one or more fuel cell system or fuel cell stack controllers 123, 125, 127 may communicate with the processor 192 to determine if the energy of the battery pack (kWh) at the current state-of-charge (SoC) is less than the second energy threshold estimated in step 716.

If the energy of the battery pack (kWh) 162 at the current state-of-charge (SoC) is lesser than the second energy threshold estimated in step 716, the system controller 190 or the one or more fuel cell system or fuel cell stack controllers 123, 125, 127 may sequentially start fuel cell stacks 122, 124, 126 in step 720. If the energy of the battery pack (kWh) 162 at the current state-of-charge (SoC) is equal to or greater than the second energy threshold estimated in step 716, the system controller 190 or the one or more fuel cell fuel cell stack controllers 123, 125, 127 may end the strategy or algorithm 700 in step 722. In some embodiments, the second energy threshold may be dependent on the power rating for fuel cell fuel cell stack 122, 124, 126, and/or battery pack 162 used in the system 100.

In some other embodiments, the fuel cell powertrain system 100 may comprise more than two fuel cells systems and/or more than one battery packs 162. The system controller 190 or the one or more fuel cell system or fuel cell stack controllers 123, 125, 127 may implement a similar rule-based power allocation approach to allocate power to the more than two fuel cell stacks 122, 124, 126 and the more than one battery packs 162.

In one embodiment, the system controller 190 or the one or more fuel cell system or fuel cell stack controllers 123, 125, 127 of the fuel cell powertrain system 100 may additionally implement strategies or algorithms based on additional sensors/signals to determine operation of the fuel cell systems 122, 124, 126. In some embodiments, a real time vehicle mass estimator strategy may be utilized to determine if the vehicle with the fuel cell powertrain system 100 is operating close to curb weight (e.g., the weight of the vehicle with all standard equipment without payload) or is operating as a bobtail (e.g., a truck without the trailer) in real time. The system controller 190 or the one or more fuel cell system or fuel cell stack controllers 123, 125, 127 may also operate a minimum number of fuel cell stacks 122, 124, 126 to sustain drive cycles at this curb weight. In some embodiments, the fuel cell stacks 122, 124, 126 and battery pack 162 may be typically sized to support a vehicle at its respective gross vehicle weight rating (GVWR) through drive cycles.

In some embodiments, if the vehicle comprising the fuel cell powertrain system 100 is operating on a bobtail, having multiple fuel cells stacks 122, 124, 126 may lead to an oversized fuel cell powertrain system 100. In some further embodiments, it may be beneficial to keep only the minimum number of fuel cell stacks 122, 124, 126 needed active so as to avoid degradation effects. In addition, using only the minimal number of fuel cell stacks 122, 124, 126 may also positively impact the throughput life consumption of all fuel cell systems in the fuel cell powertrain system 100.

Figure 8:
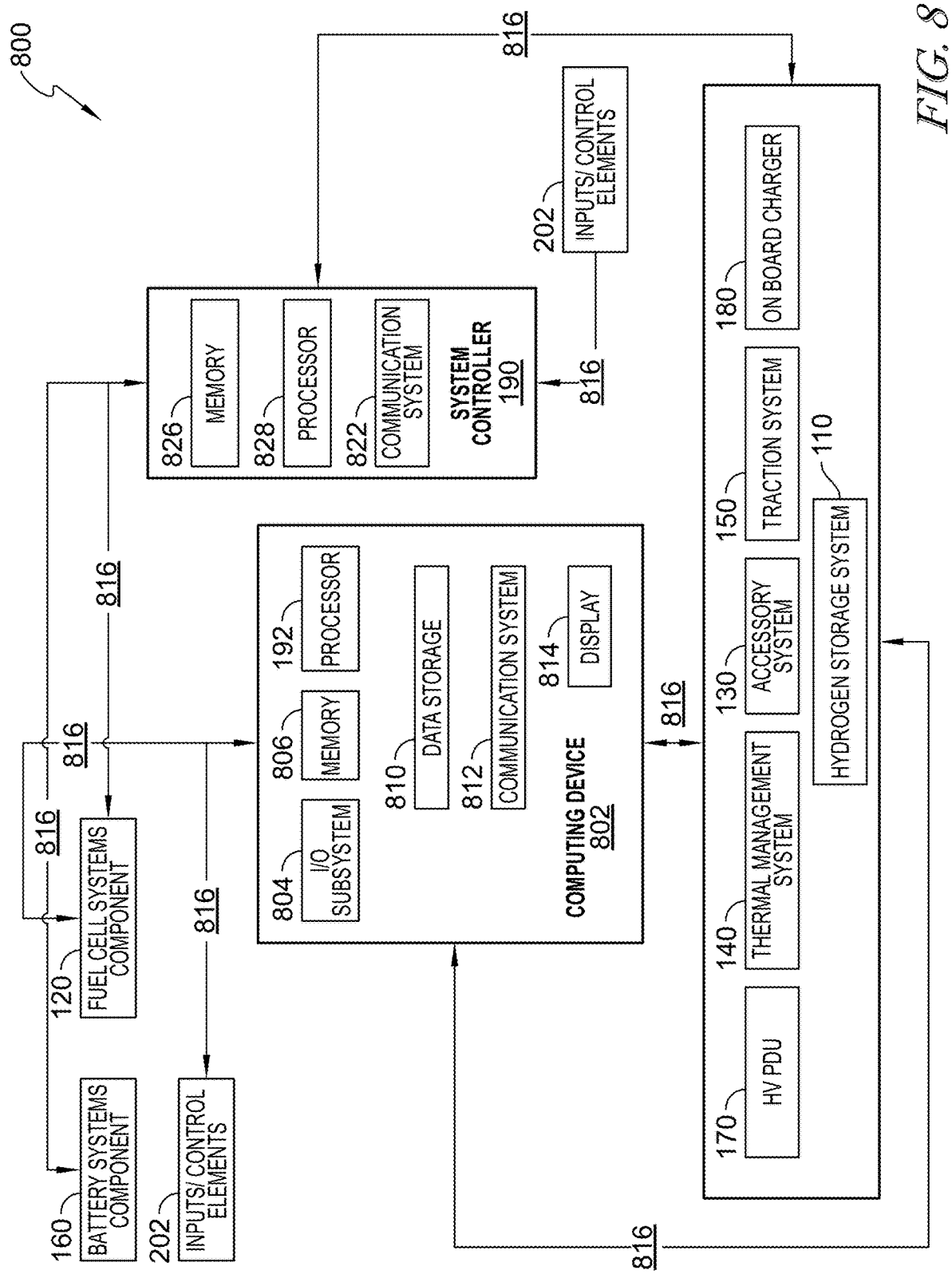
FIG. 8 is a schematic of one embodiment of a power split or power allocation strategy or algorithm in a fuel cell powertrain system.

FIG. 8 illustrates a schematic of one embodiment of a power split or power allocation method, process, strategy, instructions, or algorithm 800 in a fuel cell powertrain system 100. In some embodiments, to facilitate the transfer of data and other network communications across the fuel cell powertrain system 100, the system controller 190 may be in communication with a computing device 802 comprising a processor 192 over a network 816. The communication device 802 may be in communication with other components of the fuel cell powertrain system 100 including but not limited to the hydrogen storage system 110, the high voltage power drive unit 170, the thermal management system 140, the accessory system 130, the traction system 150, and/or the on board charger 180. In some embodiments, the system controller 190 may include a memory 826, a processor 828, and/or a communication subsystem 822. In some embodiments, the one or more fuel cell system or fuel cell stack controllers 123, 125, 127 may include memory, a processor, and/or a communication subsystem (not shown).

The computing device 802 may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The illustrative computing device 802 of FIG. 8 may include one or more of an input/output (I/O) subsystem 804, a memory 806, a processor 192, a data storage device 810, a communication subsystem 812, and a display 814 that may be connected to each other, in communication with each other, and/or configured to be connected and/or in communication with each other through wired, wireless and/or power line connections and associated protocols (e.g., Ethernet, InfiniBand®, Bluetooth®, Wi-Fi®, WiMAX, 3G, 4G LTE, 5G, etc.).

In one embodiment, the processor 192 in the computing device 802 may identify, determine, and/or optimize strategies or algorithms for optimizing the power split between the fuel cell systems component 120 and/or the battery systems component 160 in a fuel cell powertrain 100. The processor 192 may communicate the strategies or algorithms for optimizing the power split between the fuel cell stacks 122, 124, 126, and/or battery pack 162 to the system controller 190 over the network 816.

The computing device 802 may also include additional and/or alternative components, such as those commonly found in a computer (e.g., various input/output devices). In other embodiments, one or more of the illustrative computing device 802 of components may be incorporated in, or otherwise form a portion of, another component. For example, the memory 806, or portions thereof, may be incorporated in the processor 192.

The processors 192, 828 may be embodied as any type of computational processing tool or equipment capable of performing the functions described herein. For example, the processor 192, 828 may be embodied as a single or multi-core processor(s), digital signal processor, microcontroller, or other processor or processing/controlling circuit. The memory 806, 826 may be embodied as any type of volatile or non-volatile memory or data storage capable of performing the functions described herein.

In operation, the memory 806, 826 may store various data and software used during operation of the computing device 802 and/or system controller 190 such as operating systems, applications, programs, libraries, and drivers. The memory 806 is communicatively coupled to the processor 192 via the I/O subsystem 804, which may be embodied as circuitry and/or components to facilitate input/output operations with the processor 192, the memory 806, and other components of the computing device 802.

For example, the I/O subsystem 804 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations.

In one embodiment, the memory 806 may be directly coupled to the processor 192, for example via an integrated memory controller hub. Additionally, in some embodiments, the I/O subsystem 804 may form a portion of a system-on-a-chip and be incorporated, along with the processor 192, the memory 806, and/or other components of the computing device 802, on a single integrated circuit chip (not shown).

The memory 826 is communicatively coupled to the processor 828, which may be embodied as circuitry and/or components to facilitate input/output operations with the processor 828, the memory 826, and other components of the system controller 190. In one embodiment, the memory 826 may be directly coupled to the processor 828. In some components the processor 828 may perform the functions of the processor 192. In other embodiments, the system controller may comprise the computing device 802.

The data storage device 810 may be embodied as any type of device or devices configured for short-term or long-term storage of data such as, for example, memory devices and circuits, memory cards, hard disk drives, solid-state drives, or other data storage devices. The computing device 802 also includes the communication subsystem 812, which may be embodied as any communication circuit, device, or collection thereof, capable of enabling communications between the computing device 802 and other remote devices over the computer network 816.

The components of the communication subsystem 812 may be configured to use any one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.) to effect such communication among and between system components and devices.

The system controller 190 may be connected and/or in communication with the computing device 802, the fuel cell system component 120, the battery system component 160, the other components of the fuel cell power train system 100, and additional features or components (not shown) of the vehicle comprising the fuel cell powertrain system 100. The above mentioned components may be connected, communicate with each other, and/or configured to be connected or in communication with each over the network 816 using one or more communication technologies (e.g., wired, wireless and/or power line communications) and associated protocols (e.g., Ethernet, InfiniBand®, Bluetooth®, Wi-Fi®, WiMAX, 3G, 4G LTE, 5G, etc.

The display 814 of the computing device 802 may be embodied as any type of display capable of displaying digital and/or electronic information, such as a liquid crystal display (LCD), a light emitting diode (LED), a plasma display, a cathode ray tube (CRT), or other type of display device. In some embodiments, the display 814 may be coupled to or otherwise include a touch screen or other input device.

The computing device 802 may also include any number of additional input/output devices, interface devices, hardware accelerators, and/or other peripheral devices. The computing device 802 may be configured into separate subsystems for managing data and coordinating communications throughout the fuel cell powertrain system 100. In some embodiments, the computing system 802 may be a part of the system controller 190.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first", "second", "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising", "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of implementing power from first and second power sources in a fuel cell powertrain system, the method comprising:

receiving an input into a processor of the fuel cell powertrain system;
determining an output by the processor;
communicating the output by the processor to a system controller;
determining a power split by the system controller, the power split comprising:
a first power associated with the first power source, and
a second power associated with the second power source; and
implementing the power split,
wherein the first power source is a fuel cell system and the second power source is a battery system, wherein the power split is based on the input, and wherein the input is a system transient limit of the fuel cell system, number of starts and/or stops per hour of the fuel cell system, or time allowed at peak power of the fuel cell system.

2. The method of claim 1, wherein the input includes a minimum power limit associated with the fuel cell system.

3. The method of claim 2, wherein the minimum power limit is determined based on a mode of operation or a capability of the fuel cell system.

4. The method of claim 1, wherein the input is an accessory demand input, traction capability input, or driver demand input of the fuel cell powertrain system.

5. The method of claim 1, wherein the input is a power capability or state-of-charge of the battery system.

6. The method of claim 1, wherein the input is associated with a transient limit, the minimum or maximum number of starts or stops, a state-of health or a throughput of the associated power source(s).

7. The method of claim 1, wherein the fuel cell powertrain system is part of and configured to move a vehicle.

8. The method of claim 1, wherein the fuel cell powertrain system comprises a traction system configured to receive the first power and the second power.

9. The method of claim 1, wherein the input includes information about the operating efficiency of the fuel cell stack.

10. A system for implementing a power split between power sources in a fuel cell powertrain system, the system comprising:
a first power system comprising a fuel cell stack configured to produce a first power;
a second power system comprising a battery system, the second power system configured to produce a second power;
a processor configured to produce an output in response to receiving an input associated with at least one of the first power system or the second power system; and
a system controller configured to communicate with the first and second power systems to control a split between the first power and the second power in response to the output from the processor, wherein, the input is a system transient limit of the fuel cell stack, a minimum power limit of the fuel cell stack, number of starts and/or stops per hour of the fuel cell stack, or time allowed at peak power of the fuel cell stack.

11. The system of claim 10, wherein the input comprises power limits of the power sources.

12. The system of claim 10, wherein a power limit of the fuel cell stack is determined based on a mode of operation or capability of the fuel cell stack.

13. The system of claim 10, wherein the input comprises accessory demand, traction capability, or driver demand on the fuel cell powertrain system.

14. The system of claim 10, wherein the input comprises power capability or state-of-charge of the battery system.

15. The system of claim 10, wherein the input further comprises state-of health or throughput of the power sources.

16. The system of claim 10, wherein the fuel cell powertrain system is located in a vehicle, a stationary power equipment, or a mining equipment.

17. The system of claim 10, wherein the fuel cell powertrain system comprises a traction system and the input is a regeneration status of a traction system, wherein if the traction system is in a regeneration mode and speed of the powertrain system is above a threshold speed, the system controller is configured to decrease an output of the first power system to below an idle power of the first power system for limited duration.

18. The system of claim 10, wherein the input includes information about the operating efficiency of the fuel cell stack.

19. A method of implementing power from a first power source and a second power source in a fuel cell powertrain system, the method comprising:
receiving an input into a processor of the fuel cell powertrain system;
determining an output by the processor;
communicating the output by the processor to a system controller;
implementing a power split by the system controller based on a regeneration status of a traction system of the fuel cell powertrain system,
wherein if the traction system is in a regeneration mode and speed of the powertrain system is above a threshold speed, the controller is configured to decrease an output of the first power source to below an idle power of the first power source for limited duration.

20. The method of claim 19, wherein the input further includes at least two of the system transient limit of the fuel cell system, the number of starts and/or stops per hour of the fuel cell system, and the time allowed at peak power of the fuel cell system.

21. The method of claim 19, wherein the first power source is a fuel cell stack.

22. The method of claim 19, wherein the threshold speed is in the range of about 20 mph to about 40 mph.

* * * * *